United States Patent Office

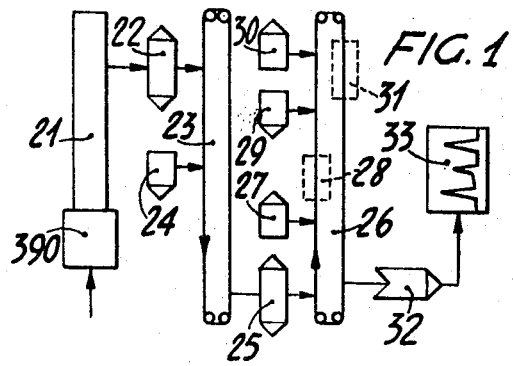
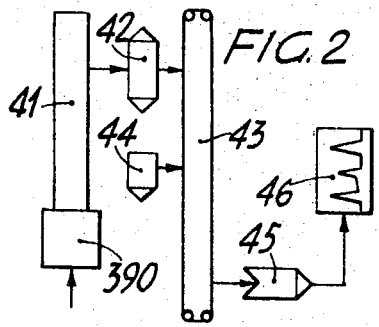
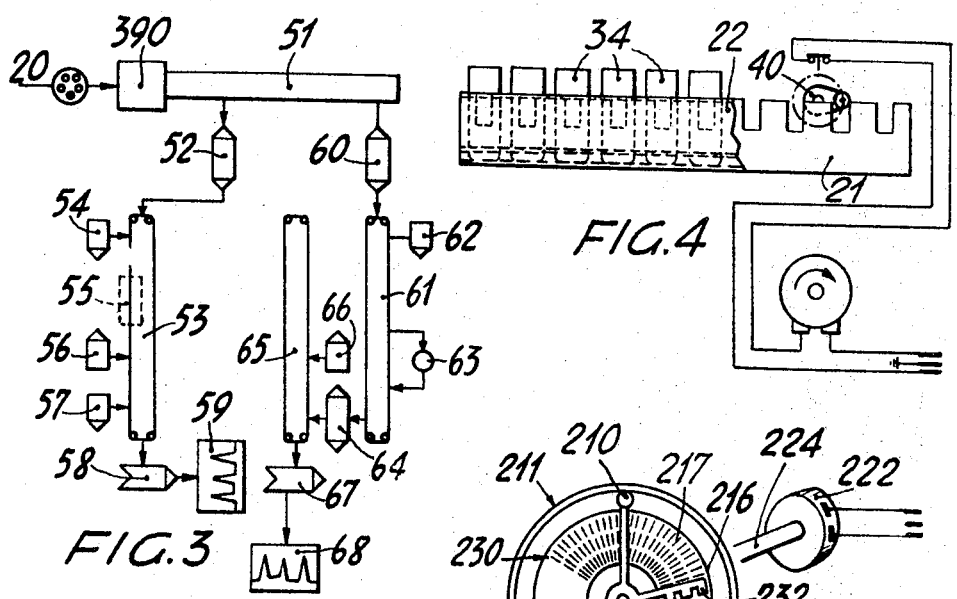
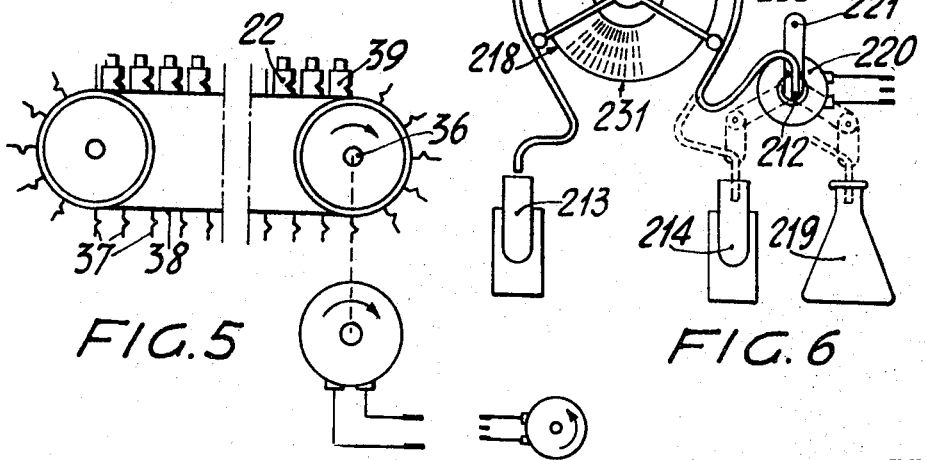

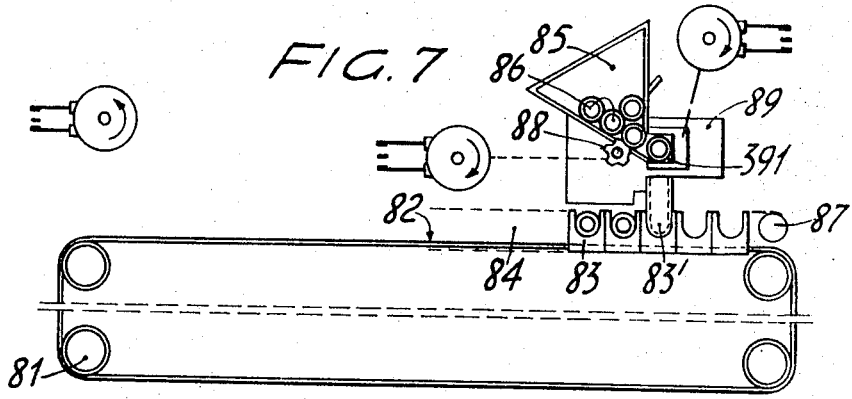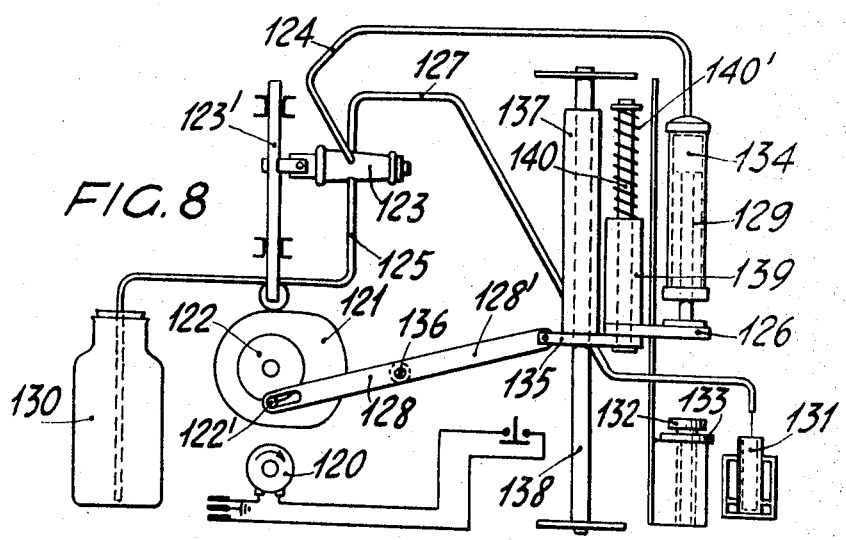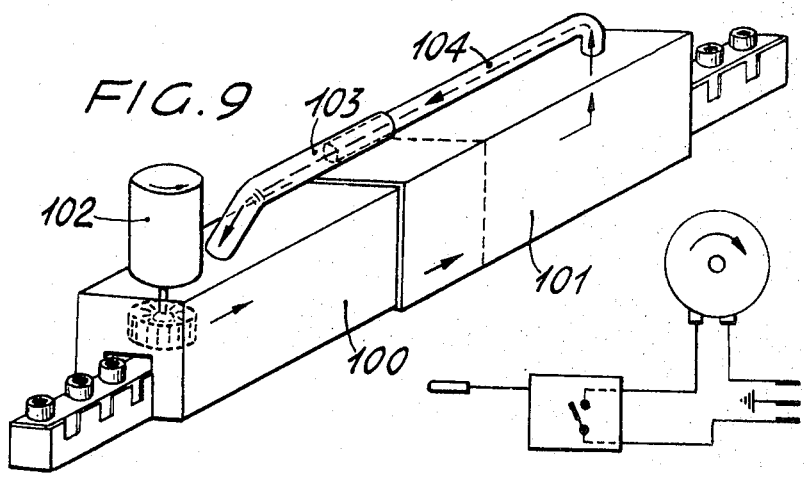

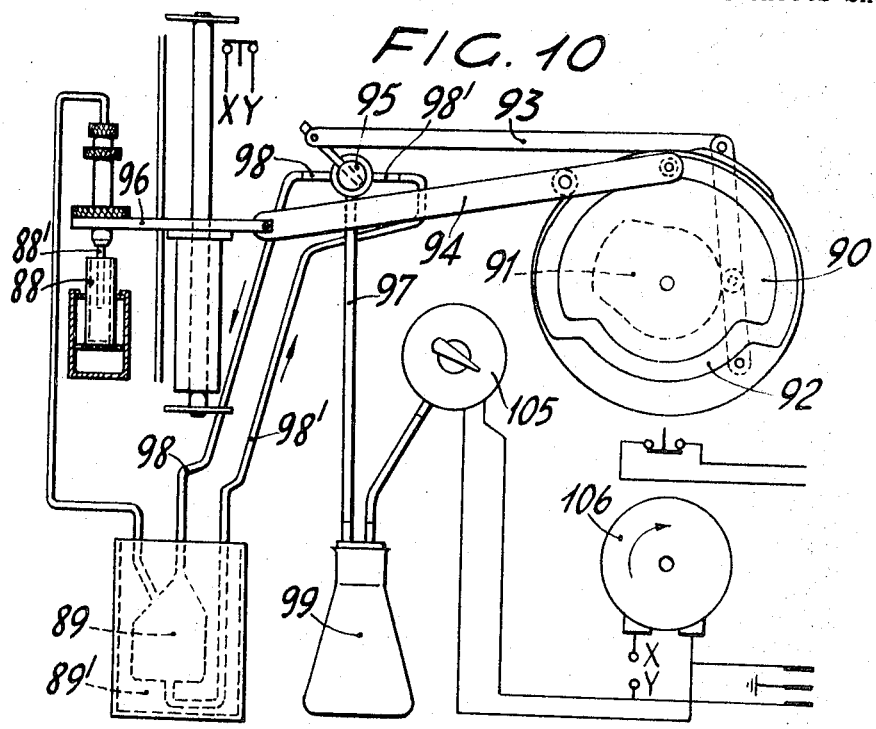
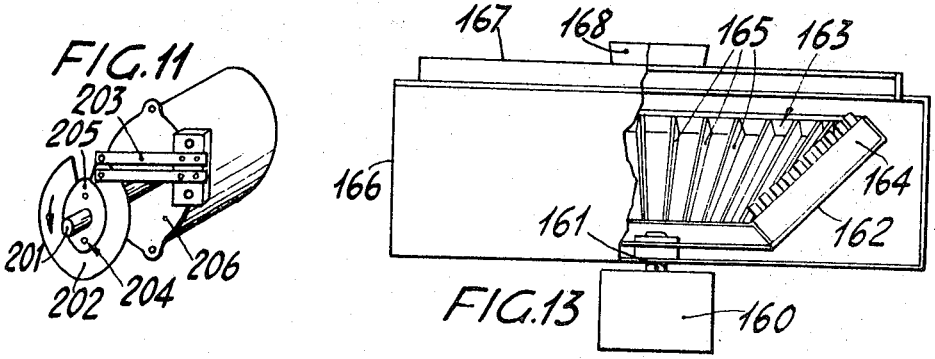
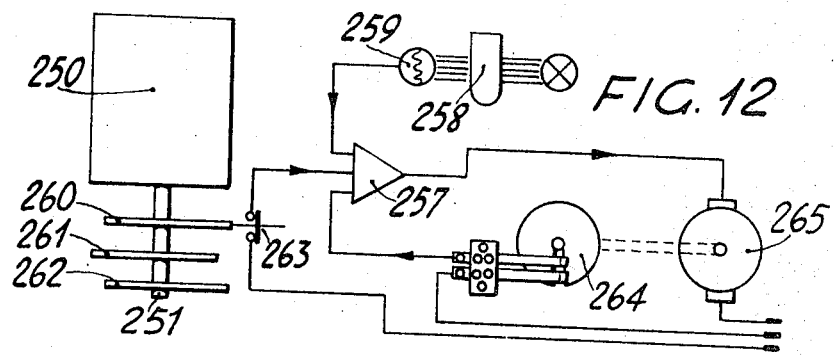

3,532,469
Patented Oct. 6, 1970

1

3,532,469
SYSTEM AND EQUIPMENT FOR THE AUTO-
MATION OF CHEMICAL ANALYSIS
Guido Vicario, Piazza Guilio Cesare 14,
Milan, Italy
Filed Oct. 27, 1967, Ser. No. 679,598
Claims priority, application Italy, Oct. 21, 1967,
21,871/67; Oct. 29, 1966, Patent 782,185
Int. Cl. C01g 23/04; C01n 31/00, 33/16
U.S. Cl. 23—253                                        20 Claims

ABSTRACT OF THE DISCLOSURE

An automatic system for performing repetitive chemical analyses, comprises one or more conveyor lines for samples to be analyzed and a number of separate instrumentalities such as transfer units, dosing mechanisms, centrifuges, recorders and printers, etc., each of these instrumentalities being operated by individual electric motors having predetermined cycles of operation, the initiation of the respective cycles of operation being under the control of master electrical synchronizing mechanism.

---

There already exist devices to perform automatically chemical and clinical analysis, beginning with the sample and finishing with the registration of the results.

The known systems, however, have different inconveniences: it is necessary to have periodically a complex replacement of the used parts, it is possible to introduce new samples only when the precedently introduced ones have been taken out, and it is impossible to apply new methods which were not foreseen by the constructor.

The object of the present invention is a system for the automatic execution of chemical analysis of an unlimited number of samples for an unlimited number of reagents. The equipment makes every single reaction in a test-tube and proceeds the test-tube in jerkily or continuous motion or by using motions that are combined of these two facilities, in a row of at least one transportation-band, along a track called "principal line" on which the samples will proceed to the "analysation-line," where the reactions are effected. The test-tubes receive from the operative units along the track, all the chemical and physical treatments scheduled by the analytic process. The treatments consist of: pipetting, dilution, addition of reagents, agitation, thermostation, centrifugation, instrumental measurement and registration of the dates. The invention includes a series of operative units, programmed according to the wishes of the chemist, and working along a transportation-band on an unlimited number of samples, which pass by one after the other.

According to the present invention it is possible to add other samples besides the already introduced ones, without interrupting their speed, furthermore to derive more analysation-lines form the same principal line, also afterwards, until a plan of simultaneous, systematical and automatical chemical reactions is realized.

The capacity of the system is enormous, because one single "analysation-line" provides up to 8.640 analysis within 24 hours. The attached drawings schematically represent as an example some practical realizations of the operating units, composing the equipment and precisely:

FIG. 1 is the general diagram of the described system fitted with one principal line and two lines derived from it, but depending one from the other. The diagram represents the equipment necessary to perform the analysis of enzimatic nitrogen urea of human blood according to known methods.

FIG. 2 is a diagram of a more simple system fitted with a principal line and only one line of analysis derived from

2 it: it represents the necessary equipment to perform the examination of cianmetahemoglobin on blood, following a known method.

FIG. 3 is an example of schematic diagram of a principal line with two analysis lines derived one after the other: the example demonstrates the componibility of an unlimited number of successive analysis. The diagram represents the equipment necessary for the simultaneous determination of transaminasis, of colestherol, of human serum, according to a known method.

FIG. 4 represents the carriage that brings the test-tube containing the samples to be analysed on the principal line.

FIG. 5 is the supply of the carriages to be let in the principal line, that is the loader or reservoir of the principal line.

FIG. 6 represents a transfer-unit of a liquid from a line to another, which is formed of a device of programmed suction with a peristaltic pump.

FIG. 7 shows a line of analysis composed of a transportation-band with a movable links and of a feed-box with a head for introducing the test-tubes into the line.

FIG. 8 schematically represents the dosation-unit of the reagents which provides the delivery of the quantity of reagent necessary for each analysis.

FIG. 9 represents a thermostatic tunnel which is used to bring to the exact temperature a part of the line of analysis.

FIG. 10 shows the unit which draws up one after the other in an automatic empting spectrophotometric cuvette the sample at the end of the chemical process, when it is ready for the reading.

FIG. 11 shows the device for the autopositioning in the choosed position of the shafts of the electro-motors of the operating units.

FIG. 12 represents a block-diagram of the synchronisation-system, actuation and autopositioning of the operating units and it is used to let them work at the wanted moment.

FIG. 13 shows in a partial section a percentrifuge to be used before introducing the tubehold carriages in the line of analysis.

Figure 14:
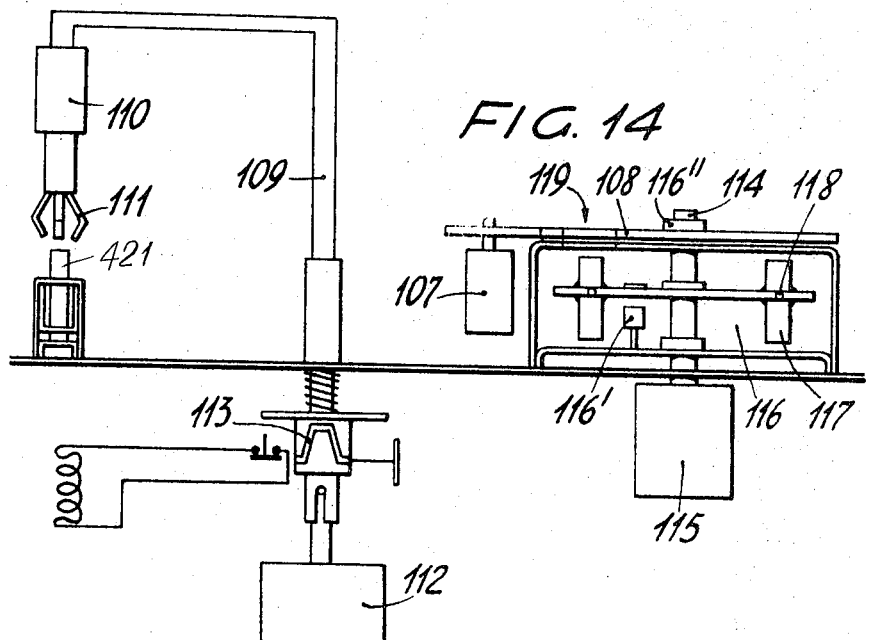

FIG. 14 shows a continuous centrifuge with automatic loading and unloading of the sample sucked away and inserted again in the principal line or in a line of analysis with a step-device.

Figure 15:
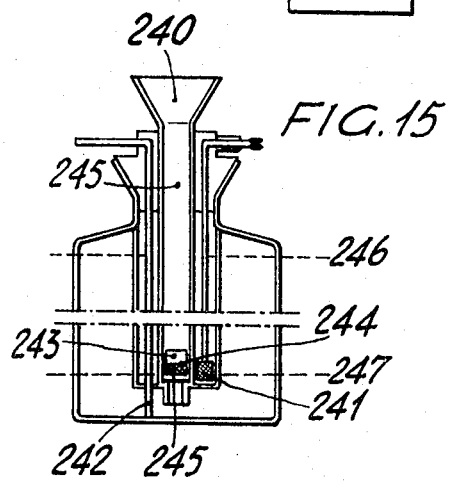

FIG. 15 shows an automatic alarm- and control-device for the liquid in the containers which supplies the dosator of reagents.

Figure 16:
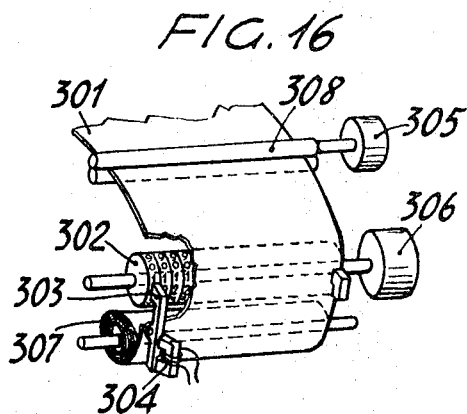

FIG. 16 shows a device for the automatic printing of the numerical values obtained at the end of each line of analysis.

Figure 17:
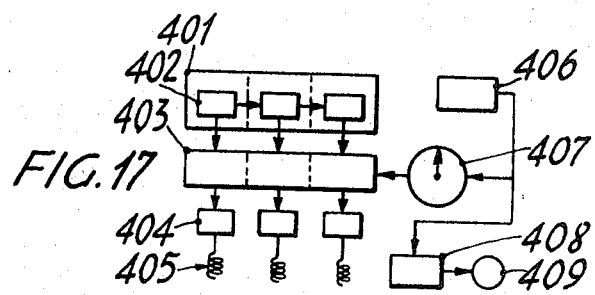

FIG. 17 represents a block-diagram of the printer-control. The diagram represented in FIG. 1 is the real disposition of the operating units for performing a nitrogen-urea-analysis of the blood and it demonstrates the facilities of combining, according to the present invention, two lines of analysis, one derived from the other. One principal line 21 is formed of carriage-transport-device, described in details in the FIG. 4, of a rail with many carriages (for example from 10 or more places).

From the line 21 lateral lines of analysis (for example 23) are derived and described in detail in FIG. 7, in correspondence to each one of them a transfer unit 22 minutely described in FIG. 6, is placed and sucks a portion of sample and transfers it on the choosed line.

The line 23 receives along its perimeter the necessary reagents from the dosing-unit 24 for diluting the samples to be analyzed. The transfer-unit 25 carries the liquid into another line of analysis 26 along which the sample undergoes at first to an addition of reagents from the dosator 27 (minutely described in FIG. 8), then thermostated in the thermostated tunnel 28 described in FIG. 9, then other additives from dosators 29 and 30, then a new thermostatation in 31 and at the end an aspiration in the registration-instrument 33, of known type, by means of the suction unit 32 described in FIG. 10.

FIG. 2 represents the disposition of the system in a simple case: the real determination of the cianmetahaemoglobin in human blood. In it there is only one line of analysis and it has 43 derived from the principle line 41 through the transfer 42, only one addition of reagents 44, one transfer of the product of the reaction through the unit 45 into the reading and recording-instrument 46.

FIG. 3 represents the real disposition of the operating units in the case of the simultaneous determination of two different compounds on the same series of samples: colestherol and transaminase. The diagram exemplifies two coupled reactions and, more in general, the facilities of draining an unlimited number of reactions from the same principal line, on which runs a series of samples.

In FIG. 3 are shown the precentrifuge 20 minutely described in FIG. 13, which lets the sample into the principal line 51; the two phases of transfer 52 and 60, respectively on lines 33 and 61, the successive processes, which on both line the samples undergo by means of diluters 54, 56, 57, 66, 62 of the thermostatic tunnel 55 of continuous automatic loading and unloading centrifuge 33, later described in FIG. 14, of reagent transfer 58 and 67, respectively into the photometric measure instruments and recorders 59 and 68.

In particular is noted that in correspondence of the point indicated with 390 is the loader-reservoir of the new samples (minutely illustrated in FIG. 5), and the synchronizer (minutely illustrated in FIG. 12).

Besides every operating unit has the device represented in FIG. 11, which has the facilities of positioning the shaft of each operating unit at a choosed point.

FIG. 4 illustrates an unlimitative example of carriage dragging 21 along the principal line. The carriages carry the sample 34 and may have other free or occupated places, while an engagement device 40 produces the advancing of the carriage.

FIG. 5 represents a system for introducing the carriages 22 which are driven by a slewing chain 38 and an electro-motor 36 and which are introduced into the system without any manual work. Every carriage has a shaping with the result that every carriage can be introduced in only one direction. The chain 38 gets on each support 37 a carriage which is carried on until position 39. There it is seized by the device 40 of FIG. 4 and transferred into the track of the principal line.

FIG. 6 represents a transfer-unit consisting of a device for the programmed suction of a peristaltic pump.

The invention is based on principle of the suction and transfer of air or of micro-volumes of liquid, from one test-tube 214 to another 213, which are located on two different lines. These actions are dosed through a peristaltic pump which is electronically programmed by digital control. Furthermore to separately suck afterwards one test-tube after the other, without polluting one or more reaction-liquids or wash-liquids, by means of mechanical displacing of the suction-tube.

The device of FIG. 6 is constructed on two different floors as follows:

On the upper floor three or more rolls 210 rotate on an axis driven by the motor 22 and compress an acid-resistant plastic tube 211 determining a vacuum at the throat of the tube 212. At the lower floor a group of electric sliding contacts 232 slide on several concentric series of a plurality of metallic contacts, which are fixed on an isolating plate and located in codificated succession. The rolls 210 rotate in connection with the sliding contact 232. A numerical programmator commands the movements of the sliding contact 232 and the connected rolls 210.

The suction tube is moved vertically and horizontally with an arm 221. During the vertical movement it sucks the samples and during the horizontal movement it moves the tube 212 over the different containers, for example 219. The position 221 is the rest position of the arm.

The transfer of the precise micro-volumes is carried out as follows:

Dipping of the suction-tube 212 in the test-tube 214. Starting of the sliding contact 232 from the zero-point 216 until a predisposed point, for instance 217; simultaneously rotation of the rolls, which operate a suction of the samples. The tube 212 returns in the rest position 221. The sliding contact 232 turns till to the fixed contacts 218. Dipping of the tube 212 in a liquid for washing 219; advancement of the sliding contact from position 218 to position 231, for example. Extraction of the suction tube 212 from the container 219 and return in the rest position 221. Rotation of the rolls 210 for a determined angle until a complete ejection of the sample is made which is additioned with the diluting liquid, into the test-tube 213.

FIG. 7 represents an analysation-line with a transport-band 82 of movable links 83, with a slanting feed-box 85 containing the test-tube 86. The test-tubes 86 slide along the slanting floor of the feed-box until they reach a rotating head 89 which rotates each time for an angle of 90°, dropping the test-tubes into the position 83.

The group consists of the feed-box 85, the rotating head 89 and the gear or teeth wheel 88 which introduce one after the other the test-tubes into the rotating head 89, is seen in the drawing in side-way, while the chain 82 is seen in plan view.

In the head 89 and along the chain, in correspondence to point 83' two devices for the permission of the dropping of the test-tubes are mounted. These devices are not illustrated in FIG. 7 but further diagrammed in FIG. 12, in the scheme with the photo-cell 259 and the test-tube 258.

Those two controls permit the verification of the exact position of the test-tube during the rotation of the head 89 in the place 83' and consent the dropping of the test-tube from the feed-box, only when a test-tube for analysation is present in front of the transfer unit on the principal line 214 (FIG. 6). The chain is tightly pulled forward by the chain-pulleys 81 of which one is motorized.

The design represents only five links, but actually there are links in each part of the chain.

At position 87 a whole is indicated in which the used test-tubes fall down, after they have done their complete course and after their liquid was suctioned off for measurement, for example, for photometric measurement at the unit represented at FIG. 10 or at FIG. 1, point 32.

FIG. 8 represents an automatic dosation-unit which adds the reactives in the test-tubes, sucking from a flask 130 with a tube 125. This tube is corresponding to the tube 242 of FIG. 15, where an alarm-device is assembled into the bottle 130 as illustrated at FIG. 15.

The dosator of FIG. 8 is assembled along the analysation line as illustrated at FIG. 7, according to the analogous scheme which is illustrated at FIG. 1, points 24, 30, 29, 27 for example.

A motor 120 moves through a cam 121, an arm 128, 128', which moves through an independent double stroke servo-regulators 135, 137, 138, 139, 126, the piston 134 of a syringe 129 so as to suck the liquid out of the bottle 130, when the piston 134 sinks and to transfer it in 131, when the piston 134 goes up 131.

These two phases are regulated by a drain-cock 123 which can also be replaced by an electro-valve that is not illustrated. At each inversion of the cycle for sinking and rising the drain-cock, operated by the cam 121, connects 125 to 124, before the servo-regulator goes down and connects 125 to 127 before the servo-regulator rises.

The servo-regulator 135, 139 acts in the manner to form a new and essential device owing to the automatic function fine-regulating from the outside and repeatable of the reagent-dispenser.

The servo-regulator receives the motion from the arm 128 and transfers it on the plate 126. The plate 135 is connected with the tube 137 and the shaft 140 and performs each time, guided on the shaft 138, a complete cycle of up and down movements. Tube 139 and plate 126 go down with the elements 137, 135, 140 until 126 meet the regulating screw 132 and then they perform an incomplete cycle limited by 132.

When 126 stops, the spring 140' compresses on the shaft 140 while 135-137-140 complete the descent and rise up to take again the two pieces 126 and 139 which are waiting.

During the ascent of 126 and 139 the dosed liquid is transferred into the test-tubes 131. The servo-regulator 135, 126 operates in a new way, so as to constitute a new device, which is substantial for the automatic fine regulation from outside and repeatable of the dosing device for reaching liquids.

FIG. 9 represents a thermostatic unit constructed as a kind of thermic tunnel 100, 101 that may be lengthened or shortened like a telescope with a fan for the movement of the air and a heating system of a traditional thermostatic device.

A pipe 103, 104 which may also be lengthened or shortened like a telescope permits the circulation of the air in the tunnel. The tunnel can be assembled on the principal line or on one or more analysation lines at a position, where it is necessary to thermoregulate the liquids for analysation.

The construction of the thermic telescope-tunnel 100, 101 permits the lengthening or shortening of the thermostation area and in this manner it is possible to regulate the thermostation time depending from the analysation method. FIG. 10 represents a unit which sucks the samples out of the analysation line, after the reaction has occurred, and transfers them into the cuvettes 89 for the spectrophotometric measurement.

It consists of a cam 90 with two profiles 91+92 and two arms 93+94 which have two programmes. One programme is the movement of the probe 88' and the other is the movement of the drain-cock 95. The arms respectively control the drain-cock (which can be rechanged by an electrovalve) and the support 96 of the probe tube 88' which sucks the liquid out of the test-tube 88 for analysation and transfers it into the cuvette 89, prepared for the spectro-photometric reading.

The suction of the liquid is obtained with a pump 105 which creates a vacuum in the container 99. When the drain-cock 95 connects the tubes 97 and 98, the effect of the suction of the liquid into the cuvette 89 occurs, while, when the drain-cock 95 connects the tube 97 with the tube 98' the cuvette 89 is emptied through a hole at the bottom of the cuvette 89, said hole being connected with a tube 98.

The complete cycle can be repeated two times within the unit-time. A first short time for the soak of the cuvette and a second time, which is a little longer, for the photometric measurement.

FIG. 11 shows a device for the automatic positioning of spindles of electromotors, for the movement of work-units of the system for the automatisatin of chemical analysis. This device consists on the principle of the subdivision of the application time of the impulse given to the motor 206 between two fixed working elements:

One element is the central synchronisator 250, FIG. 12, which gives a short starting impulse, the other is the device 202, 203, which is mechanically connected with the motor-spindle 201 and which keeps the impulse until the motor-spindle has returned to the starting position. This device can be carried out with a mechanical contact, with a photoelectric, magnetic or similar system.

The device of FIG. 11 permits a safe auto-positioning of the starting-cycle of every working unit on the desired starting point and is constructed as follows: a conductor disk 202 with an open sector 205 assembled on an insulating support 204 fixedly mounted on the spindle 201 of the electro-motor. A double sliding brush 203 is mounted on one side. The sliding brush 203 remains in the rest position in the open sector 205.

The electro-motor 206, destined to operate every working unit, receives a starting impulse from a synchronisation centre. The motor 206 starts to turn and carries the disk 202 under the sliding brush 203.

After a certain angle of rotation of the disk 202, the impulse, coming from the synchronisation centre to the motor, is interrupted and replaced by an impulse coming from the contact between the disk 202 and the sliding brush 203 and is maintained to the motor 206 until the sliding brush finds again the position constituted by the open sector, which is starting position again.

FIG. 12 represents a control centre for the operating units. A synchronisator of the starting cycle 250, 260, 263 gives a command for the beginning of every single operating unit, in order to operate them at the exact moment, while a plurality of devices for the automatic positioning mounted on the motor-shafts of the same units, gives the power-commands to the motors (FIG. 11).

The impulse of the synchronism is valid only if a test-tube is present at the control-centre. The device is constructed as follows:

The synchronisator is carried out by a motor 250 which rotates the shaft 251, carrying a certain number of cams 260, 261, 262 and also a certain number of switches. At FIG. 12, for example, there is illustrated only one 263.

The function of the synchronizer is to give the motor of every operating unit an impulse for the starting-cycle 265 in order to start the operation of every working unit. The completion of the operation is carried out by the automatic positioning of the device 264 of FIG. 11.

An electronic transistorized amplifier 257 is intended to give or to stop the controlling impulse to the motors of the operating units. It gives the impulse only if in front of every operating unit a test-tube 258 for analysation is present.

This function is obtained through a photoelectric-detector 259 or an analogous device, which is obscurated owing to the interruption of the light due to the presence of the test-tube.

FIG. 13 represents a precentrifuge for the samples. When it is necessary to centrifuge the samples before introducing them into the carriages illustrated in FIG. 5, a further centrifuge will be introduced as in FIG. 13 at a suitable point, as for example in point 20 of FIG. 3.

This device points the centrifugation of the carriages with the samples in the same order they arrive at the laboratory, avoiding therefore the mistakes and the work of the manual transfer of the samples.

The precentrifuge of FIG. 13 is comprising a motor 160 with sufficient power for turning the rotor 163, a shaft 161 which carries an element formed like a funnel or basket 163. In the cone of this element the carriages 164 are introduced in fitting tracks 165. The centrifuge has a cover 167 and a grip 168. FIG. 14 represents a new centrifuge for the continuous loading and unloading of the test-tubes from an analysation line of the system.

The centrifuge is built-up with three different elements which work in synchronism and unload the test-tubes of an analysation line 420. They load them on a centrifugation plate, centrifuge them and unload the test-tubes from this plate in the correspondent succession of the loading, back into the analysation line. These three elements consist of: (1) the centrifuge which is rotated in the proper action by the motor 115, with a rotating plate 118 and metallic test-tube containers 117 which take the horizontal position during the centrifugation. The centrifuge is equipped with a fixed bottom and a fixed cover. In the interior is a photoelectric device 116' to find again the starting position. When the device finds the zero-point 107+108, it starts to operate.

(2) The device for the finding of the zero-point is operated by the motor 107 which moves the shaft of the centrifuge by an electromagnet 114.

The motor 107 slowly rotates the plate of the centrifuge until the photoelectric device 116′ finds a mirror on the plate which causes the stopping of the motor 107.

(3) The gripper 111 is operated by an electro-magnet. It has an open and closed position. If it is drawn by the electro-magnet 110 the gripper 111 catches the test-tube.

The electromagnet gripper 111 can move up and down by means of an arm 109 which is operated by the motor 112 and the device 113, in the manner to move down in order to grasp the test-tube and to move up again in order to carry back the test-tubes. Furthermore the arm can be rotated by the motor 112 until the correspondent point 119 where the electromagnet will reopen the gripper 111 and in this manner leaves the test-tube into its container at the centrifuge 117.

A setting of two centrifuges of the same type and the same position at the analysation line working in controphases, permits to have one centrifuge always operating in its centrifugation-process and the other in the loading and unloading process. FIG. 15 shows a device for the control of the level of liquids (reagents, solvents, etc.) in containers.

This device consists of the indication of reaching the reserve-level of any liquid and in any container. The device gives an alarm in anticipation, necessary for the refilling of the container, which is nearly empty.

As an alternative this device can give an impulse to an electric valve, which will automatically refill the container.

The device is constructed as follows:

A funnel of glass 240 with a stem, narrowed at the end and outfitted with two jackets, has inside the two jackets two elements: One element consists of a detector, which is sensitive on a magnetic field 241, the other consists of a small glass-pipe, which suctions the liquid out of the container 242. A float 243 remains inside the stem of the glass-funnel and consists of a hollow glass-body 244 with a magnet at its bottom 245. If the container is filled, the float 243 remains at position 246. As soon as the liquid is suctioned out of the container through the small glass-pipe 242 by the operative unit, the float comes down the stem until position 247, where the magnet 245 of the float gives an impulse to the detector 241.

This impulse gives a ring alarm, which can not be stopped other than by refilling of liquid in the container 240. Then the float will go up again, inside the stem.

FIG. 16 represents a device for the automatic print of the instrumental values, obtained at the end of every analysation line.

The device consists of the automatical print of digital, numerical values, corresponding to the analogical value, which is provided by each end-measure-unit of traditional type, at a speed sufficient to follow the unrolling of the analysis. The device (FIG. 16) is constructed as follows:

A paper ribbon 301 is jerkily or continuously moved by the motor 305 through two or more drag rolls 308. A number of wheels, carrying convex letters 302 are jerkily moved by a step-motor 306 until they arrive at the number corresponding to the value of the measure.

This number is reached with an organ called "leader of stamping" illustrated in FIG. 17. The paper ribbon is wrapped up on the roll 307. A number of press-hammers 303 operated by electromagnets 304 are stimulated by an electronic comparator of FIG. 17. A traditional inking-band, which is not illustrated, slides between the paper band and the press-hammers.

After every print, the motor 305 turns for a predetermined angle, advancing the paper and performing a lead.

FIG. 17 represents a bloque-scheme of the printing control. The invention consists of a device which is able to select the time to bring the printing hammers in action 303 of FIG. 16 at a planned moment correspondent to the end of every analysis and instrumental measurement.

The device (FIG. 17) is constructed as follows: A synchronizer 306 of the known type generates impulses on a constant frequency. These impulses action the electronic clock 407 and an electronic control 408, which controls the rotation of the step-motor 409 illustrated at FIG. 16, place 306. In this reason the electronic clock 407 assumes the same numerical value indicated at the number rolls 302, which are in front of the printing hammers 303.

The electronic comparator compares the numerical value indicated at the decade-counted 402 with that indicated from the electronic clock 407 which seeks for the same value. When it is found, the comparator 403 sends an impulse to the amplifier 404 in order to release the electromagnets 405 which are illustrated at FIG. 16, place 304.

The system and the related equipment for the automation of chemical analysis according to the invention realizes the following advantages:

(1) It never needs to be stopped for the supply of the samples (continuous system). In fact in the loading unit (FIG. 5) may be introduced an unlimited number of carriages.

(2) It excludes all handling from the moment of the drawing of the samples to its complete utilization. Actually doesn't need any manual transfer from the collecting test-tubes to the test-tubes of the feed-box.

(3) It doesn't admit the crossing of samples: This is obtained thanks to a key-system, for instance: assymmetry of the carriages, which gives them a compulsory sense of introduction. Besides the carriages are progressively numbered.

(4) It allows to derive from the principal line so many lines of analysis as are the analysis to be planned. For instance in the specific field of chemical clinical analysis one can locate along the principal line four lines of analysis, which gives for example the values of nitrogen (azothemie), sugar, glycemie, colestherolemie, bilirubinemie.

What is claimed is:

1. In a system for automatically performing chemical analysis comprising in combination, first means for advancing carriages, each of which contains a plurality of samples of liquids to be analyzed, second means including principal conveyor rail means for moving carriages away from the inserting means, third means including a subsidiary conveyor rail means for moving test tubes for individual analysis, fourth means including transfer means for removing a portion of sample from a carriage on the principal conveyor rail means and dispensing said portion to a test tube on the subsidiary conveyor rail means, fifth means including dosing means for adding a measured amount of reagent to said portion, sixth means for determining the effect of said addition of reagent, seventh means including printing means responsive to said determination of effect to provide a visible indicia recording indicative of said determination for each said portion of sample, each of said enumerated means being actuated during a cycle of operation by electric motor means, and electric master control means for synchronizing the initiation of a cycle of operation of each said enumerated means.

2. The system defined in claim 1, wherein said transfer means includes adjustable peristaltic pump means having a suction tube to be inserted into sample liquid, and electrically actuated arm means for moving the suction tube in reciprocal vertical and horizontal directions.

3. The invention defined in claim 2, wherein said peristaltic pump means includes a flexible tube connected with said suction tube, said flexible tube being arranged in an arcuate path, a rotatably mounted pump arm having three spaced rollers for compressing said flexible tube, electric motor means for rotating said pump arm, and a plurality of arcuately arranged electrical contacts arranged for engagement with a contact on said pump arm for limiting operation of the motor means rotating the pump arm.

4. The invention defined in claim 1, wherein said means for determining the effect of addition of reagent includes spectrophotometer means.

5. The invention defined in claim 1, wherein said means for determining the effect of addition of reagent includes means for recording in analog form, and means for converting said analog form to digital form for response by said printing means.

6. A system as defined in claim 1 which includes additional subsidiary conveyor rail means, transfer means and dosing means equivalent respectively to said third, fourth and fifth enumerated means, and also includes means for centrifuging test tubes, said last-mentioned means also being actuated during a cycle of operation by electric motor means synchronized by said electric master control means.

7. A system as defined in claim 1 which includes additional subsidiary conveyor rail means, transfer means and dosing means equivalent respectively to said third, fourth, and fifth enumerated means, and also includes thermostatic tunnel means arranged to receive test tubes moving along a subsidiary conveyor rail means.

8. The invention defined in claim 1, wherein each of said carriages comprises an elongated frame for holding a row of sample liquids in spaced linear alignment, and said electric motor means for actuating the first enumerated means includes a rotatable shaft having a crank arm engageable with spaced projections on a carriage for advancing the carriage in step-by-step movement.

9. The invention defined in claim 8, wherein said first means for advancing carriages includes a continuous belt conveyor means for moving carriages in a transverse direction, said belt conveyor means having a plurality of transverse partitions for receiving individual carriages therebetween, said partitions and at least one side wall of each of the carriages having complementarily formed cross-sectional configurations whereby said carriages can be introduced between the partitions only when facing in one direction.

10. The invention defined in claim 1, wherein said subsidiary conveyor rail means includes endless chain conveyor means for carrying test tubes in a predetermined path between a first and a second location, test tube loading means at said first location and disposal means for the test tube at the second location, said loading means including an oscillating head, an inclined surface for a supply of test tubes leading to the oscillating head, and means controlling movement of test tubes to said head, said mechanisms including electric motor actuating means controlled by said electric master control means.

11. The invention defined in claim 1, wherein said dosing means for adding reagent includes a pump having a reciprocating member, regulating stop means for limiting movement of said member in one direction to control the volume of said pump, rotary crank means for positively moving said member in the opposite direction and resilient lost-motion means for urging return movement of said member to said stop means, conduit means including reversing valve means for alternatively connecting said pump to withdraw measured amounts of reagent from a supply and deliver said reagent to a test tube, said rotary crank means including cam means for operating the reversing valve means, and electric motor actuating means controlled by said electric master control means for rotating the crank means.

12. The invention defined in claim 1, wherein said subsidiary conveyor rail means includes spectrophotometric analysis means including vacuum pump means, probe means for withdrawing sample from a test tube, rotary cam means, closed cuvette means for analysis of a sample, a closed vessel for analyzed samples, and conduit means including reversing valve means, said cam means including a reciprocating member for inserting the probe means into a sample in a test tube to withdraw sample and to remove the probe means to dispense said withdrawn sample to the cuvette means, said conduit means including a first tube connecting the reversing valve means and the closed vessel with the inlet of the vacuum pump means, a second tube connecting the reversing valve means and an upper portion of the cuvette means for establishing a vacuum therein, a third tube connecting the reversing valve means and the bottom of the cuvette means for withdrawing analyzed sample therefrom, and a fourth tube connecting an upper portion of the cuvette means and the probe means for drawing sample into the cuvette means by vacuum established therein, said rotary cam means including means for selectively actuating the reversing valve means to connect the first and second tubes while the probe means is inserted in a sample and to connect the first and third tubes while the probe means is removed, and electric motor actuating means controlled by said electric master control means for rotating the cam means.

13. The invention defined in claim 1, wherein one of said subsidiary conveyor rail means includes elongated tunnel heating means enclosing a series of test tubes, said tunnel heating means including telescoping hood means, telescoping conduit means, and blower means for circulating heated air in said hood means.

14. The invention defined in claim 1, wherein said electric master control means includes circuit means connected with each of the electric motor means for each of said enumerated means, said circuit means including means for detecting the presence of a test tube in position for initiation of the cycle of operation of each said electric motor means.

15. The invention defined in claim 1, wherein said electric master control means includes a conductive disc secured for rotation with the shaft of each of said electric motor means, a pair of electrical contacts in electric contact with each of said discs for maintaining the respective motor connected after initiation of a cycle of operation, said disc having a nonconductive area for contact with the respective pair of contacts to discontinue said cycle.

16. The invention defined in claim 1, wherein said principal conveyor rail means includes pre-centrifuging means, said last named means comprising a generally conically arranged holder for carriages, and means for rotating said holder about a vertical axis.

17. The invention defined in claim 1, wherein said system includes centrifuging means for samples comprising an element rotatable about a vertical axis and provided with a plurality of circularly arranged test tube holders, and means for automatically moving test tubes between a subsidiary conveyor rail means and said test tube holders said moving means includes photoelectric means for determining a predetermined position on said element rotatable about a vertical axis, electric motor means responsive to said photoelectric means to rotate the element to the predetermined position, and electromagnetically operated gripper means having opened and closed positions for gripping a test tube and for releasing it.

18. The invention defined in claim 17, wherein said system includes a pair of said centrifuging means disposed adjacent to the same portion of a subsidiary conveyor rail means, and means for coordinating the operation thereof for alternative moving of a series of test tubes to the holders of one centrifuging means while the test tubes of the other centrifuging means are moved to the spaces vacated by the first series, and vice versa.

19. The invention defined in claim 1, wherein said dosing means includes a vessel for a supply of reagent having a vertical filling extending into the vessel towards the bottom thereof, a second tube surrounding the filling tube and closed with respect to the interior of the vessel, float means entrained within said filling tube and vertically movable with the level of reagent, said float means including a paramagnetic material and signal means including detecting means responsive to the presence of said paramagnetic material, said detecting means been fixed between said two tubes at a low level of the vessel.

20. The invention defined in claim 1, wherein said printing means includes a paper tape, a rotary member having numerical indicia arranged in sequential rows thereon, means for rotating said rotary member in step-by-step sequence, means for observing a sample for analysis including means for producing analog data therefrom, means for converting said analog result to digital form, a row of electromagnetically operated hammers positioned to impress numerical indicia presented by said rotary member on said tape, means responsive to the means for converting the analog data to digital form for rotating the rotary member for respective impressing of numerical data on the tape in accordance with said digital data corresponding to an observed sample.

References Cited
UNITED STATES PATENTS

| | | | |
|---|---|---|---|
| 3,168,124 | 2/1965 | Lenkey | 23—253 XR |
| 3,239,312 | 3/1966 | Bell et al. | 23—253 |
| 3,266,298 | 8/1966 | Whitehead et al. | 23—253 XR |
| 3,327,535 | 6/1967 | Sequeira | 23—259 XR |
| 3,415,627 | 12/1968 | Rait | 23—253 |
| 3,432,271 | 3/1969 | Wasilewski | 23—253 |

MORRIS O. WOLK, Primary Examiner

R. E. SERWIN, Assistant Examiner

U.S. Cl. X.R.

23—259